US009960614B2

United States Patent
Hwang

(10) Patent No.: US 9,960,614 B2
(45) Date of Patent: May 1, 2018

(54) DC-DC CONVERTER WITH PROTECTION CIRCUIT FOR CONNECTION ERROR

(71) Applicant: HYUNDAI MOBIS CO., LTD., Seoul (KR)

(72) Inventor: Soo Bin Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 224 days.

(21) Appl. No.: 14/926,361

(22) Filed: Oct. 29, 2015

(65) Prior Publication Data

US 2016/0126767 A1 May 5, 2016

(30) Foreign Application Priority Data

Oct. 31, 2014 (KR) .................. 10-2014-0150192

(51) Int. Cl.
| H02J 7/00 | (2006.01) |
| H02M 1/32 | (2007.01) |
| H02M 3/158 | (2006.01) |

(52) U.S. Cl.
CPC .......... *H02J 7/0034* (2013.01); *H02J 7/0054* (2013.01); *H02M 1/32* (2013.01); *H02M 3/158* (2013.01); *H02J 2007/0059* (2013.01)

(58) Field of Classification Search
CPC ..................................................... Y02E 60/12
USPC ......................................................... 320/103
See application file for complete search history.

(56) References Cited

U.S. PATENT DOCUMENTS

| 6,366,054 | B1 * | 4/2002 | Hoenig | G01R 31/3631 320/132 |
| 6,891,352 | B2 * | 5/2005 | Miyazaki | H02J 7/0026 320/118 |
| 7,248,020 | B2 * | 7/2007 | Hidaka | G01R 19/16542 320/116 |
| 7,405,579 | B2 * | 7/2008 | Okamoto | G01R 31/3658 320/116 |
| 7,872,443 | B2 * | 1/2011 | Ward | H02J 7/35 320/103 |
| 2005/0083715 | A1 * | 4/2005 | Guillarme | H02M 1/32 363/65 |
| 2008/0212345 | A1 * | 9/2008 | Yamashita | H02J 7/047 363/50 |
| 2013/0169212 | A1 * | 7/2013 | Sun | H02M 3/33592 320/103 |

(Continued)

FOREIGN PATENT DOCUMENTS

| JP | 4003255 B2 | 11/2007 |
| JP | 2013-027273 A | 2/2013 |
| KR | 10-1208570 B1 | 12/2012 |

*Primary Examiner* — Yalkew Fantu
(74) *Attorney, Agent, or Firm* — NSIP Law

(57) ABSTRACT

The present invention provides a DC-DC converter which is connected to a high voltage battery and a low voltage battery to convert a high voltage of the high voltage battery into a low voltage to charge the low voltage battery, including: a connecting unit which connects the high voltage battery and the low voltage battery; a converting unit which converts a high voltage supplied from the high voltage battery into a low voltage to charge the low voltage battery; and a protection circuit which is located between the connecting unit and the converting unit and is turned off when at least one of the high voltage battery and the low voltage battery is erroneously connected, to shut off a current path between the high voltage battery and the low voltage battery.

12 Claims, 13 Drawing Sheets

(56) References Cited

U.S. PATENT DOCUMENTS

2014/0084843 A1\* 3/2014 Pham ................. B60L 11/1824
                                                                       320/103

\* cited by examiner

DC-DC CONVERTER WITH PROTECTION CIRCUIT FOR CONNECTION ERROR

CROSS-REFERENCE TO RELATED APPLICATIONS

This application claims priority under 35 U.S.C. § 119 to Korean Patent Application No. 10-2014-0150192, filed on Oct. 31, 2014, in the Korean Intellectual Property Office, the disclosure of which is incorporated herein by reference in its entirety.

TECHNICAL FIELD

The present invention relates to a DC-DC converter, and more particularly, to a DC-DC converter with a protection circuit for a connection error which may prevent a connection error of a battery.

BACKGROUND

In order to solve the problems such as air pollution or increase of $CO_2$ emission, development of an electric vehicle such as a pure electric vehicle (EV) using electricity with a driving motor as a driving source without having exhaust gas or a hybrid electric vehicle (HEV) having an engine and a driving motor as a driving source has drawn attention.

Generally, a power system of an electric vehicle is configured by a main battery (a high voltage battery) which supplies driving power of a driving motor, a battery management system (BMS), an auxiliary battery (a low voltage battery) which supplies driving power of other vehicle electric components and a plurality of electric devices.

The electric vehicle includes an inverter and a low voltage DC-DC converter (LDC). The inverter converts a high DC voltage which is generated in the high voltage battery (a main battery) into an AC voltage to control the motor to be driven and LDC converts the high voltage generated in the high voltage battery to output a low voltage and charge the low voltage battery (an auxiliary battery).

Therefore, since the high voltage battery and the low voltage battery are connected to the LDC, a high voltage (+) terminal and a high voltage (−) terminal to which the high voltage battery is connected and a low voltage (+) terminal and a low voltage (−) terminal to which the low voltage battery is connected are provided in the LDC.

In this case, when an operator connects the high voltage battery and the low voltage battery to the LDC, an erroneous connection may occur due to mistake or carelessness of the operator.

As examples of the erroneous connection, the (−) terminal of the high voltage battery is connected to the high voltage (+) terminal and the (+) terminal of the high voltage battery is connected to the high voltage (−) terminal, or the (−) terminal of the low voltage battery is connected to the low voltage (+) terminal and the (+) terminal of the low voltage battery is connected to the low voltage (−) terminal, or the low voltage battery is connected to the high voltage terminal, or the high voltage battery is connected to the low voltage terminal.

As described above, when the battery is erroneously connected, a short-circuit may be generated through a body-diode of an FET and as a result, fatal influence may be applied to a vehicle system.

Accordingly, in order to prevent an accident due to the erroneous connection, in the related art, a method which opens the circuit using a fuse in the event of over-current to stop supplying the power.

According to the method of shutting off the over-current using the fuse of the related art, even though it is possible to shut off the circuit, but since the circuit is mechanically shut off, the vehicle cannot be reactivated and thus cannot be driven before exchanging the converter.

The fuse which is used for the converter is an expensive component and thus lots of cost is spent for post-processing. Further, in recent years, circuit components have been diversified and thus working efficiency is lowered.

SUMMARY

An exemplary embodiment of the present invention provides a DC-DC converter with a protection circuit for a connection error which is connected to a high voltage battery and a low voltage battery to convert a high voltage of the high voltage battery into a low voltage to charge the low voltage battery, including: a connecting unit which connects the high voltage battery and the low voltage battery; a converting unit which converts a high voltage supplied from the high voltage battery into a low voltage to charge the low voltage battery; and a protection circuit which is located between the connecting unit and the converting unit and is turned off when at least one of the high voltage battery and the low voltage battery is erroneously connected, to shut off a current path between the high voltage battery and the low voltage battery.

In this case, the protection circuit may include a first protection element which is connected between a high voltage input line to which a positive electrode of the high voltage battery is connected and a low voltage output line to which a positive electrode of the low voltage battery is connected and is turned on when a turn on voltage or higher is applied to the high voltage input line; and a second protection element which is connected between the low voltage line and the low voltage output line to which a negative electrode of the high voltage battery and a negative electrode of the low voltage battery are commonly connected and is turned on when the turn on voltage or higher is applied to the low voltage output line. Here, the first and second protection elements may be formed of MOS-FETs.

In this case, when the first protection element is turned on, a current path may be formed in the low voltage output line and when the first protection element is turned off, the current path of the low voltage output line may be shut off.

When the first protection element is turned on, the second protection element may be turned on or turned off in accordance with a voltage on the low voltage output line.

In the meantime, a gate of the first protection element may be connected between the converting unit and the connecting unit on the high voltage input line; a source of the first protection element may be connected to the converting unit along the low voltage output line; and a drain of the first protection element may be connected to the connecting unit along the low voltage output line.

On the other hand, a gate of the second protection element may be connected between the first protection element and the converting unit on the low voltage output line; a source of the second protection element may be connected to the converting unit along the low voltage line; and a drain of the second protection element may be connected to the connecting unit along the low voltage line.

The converting unit may include: a first switching element which is connected between the high voltage input line and the low voltage output line; a second switching element which is connected between the low voltage output line and the low voltage line; and an inductor which is connected between a contact of the first and second switching elements and the first protection element.

The connecting unit may include: a high voltage battery positive connection terminal which is located on the high voltage input line and is connected with a positive electrode of the high voltage battery; a low voltage battery positive connection terminal which is located on the low voltage output line and is connected with a positive electrode of the low voltage battery; and a negative connection terminal which is located on the low voltage line and commonly connected with a negative electrode of the high voltage battery and a negative electrode of the low voltage battery.

A case when at least one of the high voltage battery and the low voltage battery is erroneously connected may include at least one of a case when the high voltage battery is normally connected but the low voltage battery is erroneously connected, a case when the high voltage battery is reversely connected and the low voltage battery is erroneously connected, a case when the low voltage battery is normally connected but the high voltage battery is erroneously connected, and a case when the high voltage battery is erroneously connected and the low voltage battery is reversely connected.

DETAILED DESCRIPTION OF EMBODIMENTS

Figure 1:
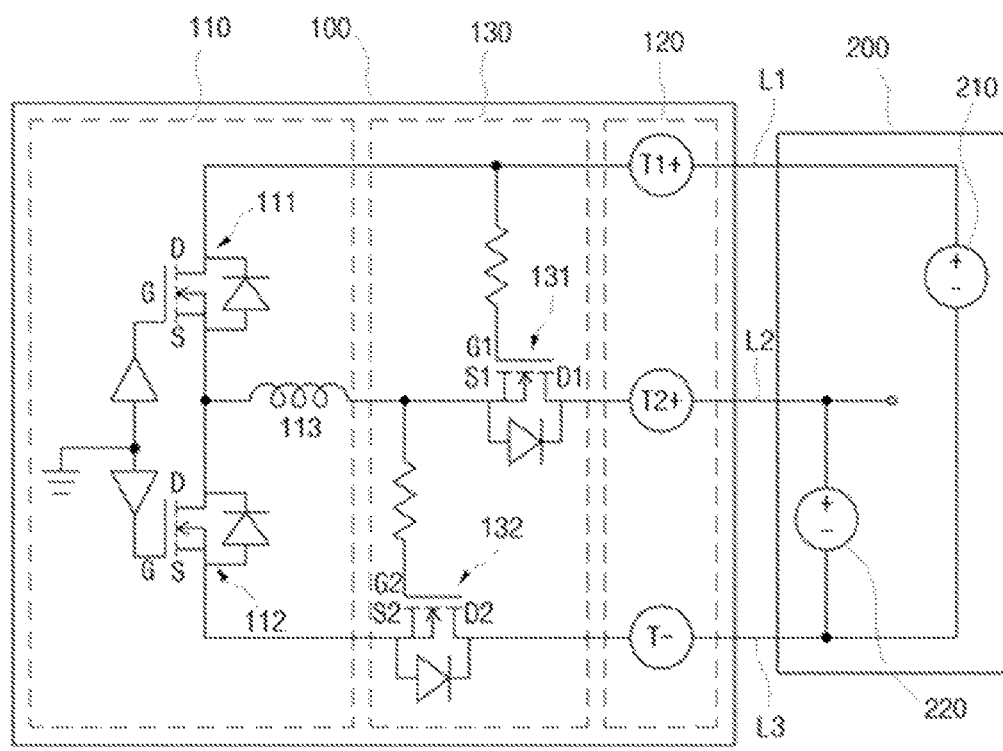
FIG. 1 is a circuit diagram of a DC-DC converter with a protection circuit for a connection error according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Advantages and characteristics of the present invention and a method of achieving the advantages and characteristics will be clear by referring to exemplary embodiments described below in detail together with the accompanying drawings. However, the present invention is not limited to the exemplary embodiment disclosed herein but will be implemented in various forms. The exemplary embodiments are provided to enable the present invention to be completely disclosed and the scope of the present invention to be easily understood by those skilled in the art. Therefore, the present invention will be defined only by the scope of the appended claims. Like reference numerals indicate like elements throughout the specification.

In the following description of the exemplary embodiments of the present invention, a detailed description of known configurations or functions incorporated herein will be omitted when it is determined that the detailed description may unnecessarily make the subject matter of the present invention unclear. Further, the terms used in the description are defined considering the functions of the exemplary embodiment of the present invention and may vary depending on the intention or usual practice of a user or operator. Accordingly, the terms need to be defined based on details throughout this specification.

Hereinafter, a DC-DC converter with a protection circuit for a connection error according to an exemplary embodiment of the present invention will be described in detail with reference to accompanying drawings.

FIG. 1 is a diagram illustrating a DC-DC converter with a protection circuit for a connection error according to an exemplary embodiment of the present invention.

Referring to FIG. 1, a power supply 200 is connected to a DC-DC converter 100 and the DC-DC converter 100 converts a high voltage supplied from a high voltage battery 210 of the power supply 200 into a low voltage and supplies the converted low voltage to a low voltage battery 220 of the power supply 200 to charge the low voltage battery 220.

Therefore, the DC-DC converter 100 includes a high voltage input line L1 to which the high voltage from the high voltage battery 210 is input, a low voltage output line L2 from which a low voltage is output to the low voltage battery 220, and a low voltage line L3 to which a negative electrode of the high voltage battery 210 and a negative electrode of the low voltage battery 220 are connected.

In this case, the DC-DC converter 100 includes a converting unit 110, a connecting unit 120, and a protection circuit 130. The protection circuit 130 is located between the converting unit 110 and the connecting unit 120 and the power supply 200 is connected to the connecting unit 120.

The converting unit 110 converts the high voltage which is supplied from the high voltage battery 210 through the high voltage input line L1 into a low voltage and supplies the converted low voltage to the low voltage battery 220 through the low voltage output line L2 to charge the low voltage battery 220.

The connecting unit 120 is configured by terminals to which the power supply 200 is connected and is configured by a high voltage battery positive connection terminal T1+, a low voltage battery positive connection terminal T2+ and a negative connection terminal T−.

The high voltage battery positive connection terminal T1+ is located on the high voltage input line L1 and the positive electrode of the high voltage battery 210 is connected to the high voltage battery positive connection terminal T1+.

The low voltage battery positive connection terminal T2+ is located on the low voltage output line L2 and the positive electrode of the low voltage battery 220 is connected to the low voltage battery positive connection terminal T2+.

The negative connection terminal T− is located on the low voltage line L3 and the negative electrode of the high voltage battery 210 and the negative electrode of the low voltage battery 220 are commonly connected to the negative connection terminal T−.

The protection circuit 130 is located between the converting unit 110 and the connecting unit 120 to prevent the shot circuit which is generated when the power supply 200 is erroneously connected to the DC-DC converter 100, by a circuit. In this case, the connection error refers to a case when the circuits are erroneously connected such as reverse connection or erroneous connection.

A configuration of the converting unit 110 will be described in detail. The converting unit 110 may be configured by a first switching element 111, a second switching element 112, and an inductor 113.

The first switching element 111 is connected between the high voltage input line L1 and the low voltage output line L2. That is, the first switching element 111 is located between the high voltage battery positive connection terminal T1+ and the low voltage battery positive connection terminal T2+.

In this case, a drain D of the first switching element 111 is connected to the high voltage battery positive connection terminal T1+ through the high voltage input line L1 and a source S of the first switching element 112 is located between the low voltage battery positive connection terminal T2+ via the low voltage output line L2.

The second switching element 112 is connected between the low voltage output line L2 and the low voltage line L3. That is, the second switching element 112 is located between the low voltage battery positive connection terminal T2+ and the negative connection terminal T−.

In this case, a drain D of the second switching element 112 is connected to a source S of the first switching element 111 through the low voltage output line L2 and the source S of the second switching element 112 is connected to the negative connection terminal T−.

The inductor 113 is connected between a contact n1 of the first switching element 111 and the second switching element 112 and a first protection element 131 of the protection circuit 130.

The first and second switching elements 111 and 112 may be N-MOS FETs like the exemplary embodiment, but may be P-MOS FETs. A structure of the converting unit 110 is a known technology and detailed description thereof will be omitted.

A configuration of the protection circuit 130 will be described in detail. The protection circuit 130 may be configured by a first protection element 131 and a second protection element 132.

In this case, the first and second protection elements 131 and 132 may be P-MOS FETs or N-MOS FETs and in the exemplary embodiment, an example in which the first and second protection elements 131 and 132 are N-MOS FETs will be described.

The first protection element 131 is connected between the high voltage input line L1 to which the positive electrode of the high voltage battery 210 is connected and the low voltage output line L2 to which the positive electrode of the low voltage battery 220 is connected and is turned on when a turn-on voltage or higher is applied to the high voltage input line L1.

A gate G1 of the first protection element 131 is connected between the converting unit 110 and the connecting unit 120 on the high voltage input line L1 and specifically, located between the drain D of the first switching element 111 an the high voltage battery positive connection terminal T1+.

A source S1 of the first protection element 131 is connected to the converting unit 110 along the low voltage output line L2 and specifically, connected to the inductor 113.

A drain D1 of the first protection element 121 is connected to the connecting unit 120 along the low voltage output line L2 and specifically, connected to the low voltage battery positive connection terminal T2+.

The second protection element 132 is connected between the low voltage line L3 to which a negative electrode of the high voltage battery 210 and a negative electrode of the low voltage battery 220 are commonly connected and the low voltage output line L2 and is turned on when a turn-on voltage or higher is applied to the low voltage output line L2.

A gate G2 of the second protection element 132 is located on the low voltage output line L2 to be connected between the first protection element 131 and the converting unit 110 and specifically, connected between the inductor 113 and the source S1 of the first protection element 131.

A source S2 of the second protection element 132 is connected to the converting unit 110 along the low voltage line L3 and specifically, connected to the source S of the second switching element 112.

A drain D2 of the second protection element 132 is connected to the connecting unit 120 along the low voltage line L3 and specifically, connected to the negative connection terminal T−.

When a turn on voltage or higher of the first protection element 131 is applied through the high voltage input line L1, the first protection element 131 is turned on and thus a current path is formed in the low voltage output line L2.

In contrast, when a voltage which is lower than the turn on voltage of the first protection element 131 is applied through the high voltage input line L2, the first protection element 131 is turned off and thus a current path of the low voltage output line L2 is shut off.

In the meantime, even though the first protection element 131 is turned on to form the current path in the low voltage output line L2, when a voltage which is lower than the turn on voltage of the second protection element 131 is applied through the low voltage output line L2, the second protection element 132 is not turned on, but is maintained in a turned-off state.

Accordingly, when the first protection element 131 is turned on, the second protection element 132 is turned on or turned off in accordance with the voltage on the low voltage output line L2.

According to the configuration of the protection circuit 130 of the present invention as described above, since the first and second protection circuits 131 and 132 are implemented by MOS FETs, the first and second protection circuits 131 and 132 are turned on only when the voltages of the gates G1 and G2 are applied, due to characteristic of the MOS FET. Accordingly, in the event of reverse connection, since (−) voltage is applied to the gates G1 and G2 of the first and second protection elements 131 and 132, the first and second protection elements 131 and 132 are maintained in a turned-off state and a loop through which the current flows does not exist, so that the short circuit caused by the reverse connection may be prevented by a circuit.

In the above description, the configuration of the DC-DC converter with a protection circuit for a connector error according to the exemplary embodiment of the present invention has been described with reference to FIG. 1. Hereinafter, with a case when the power supply 200 is erroneously connected to the DC-DC converter as an example, an operation of a protection circuit according to an exemplary embodiment of the present invention will be described.

Figure 2A:
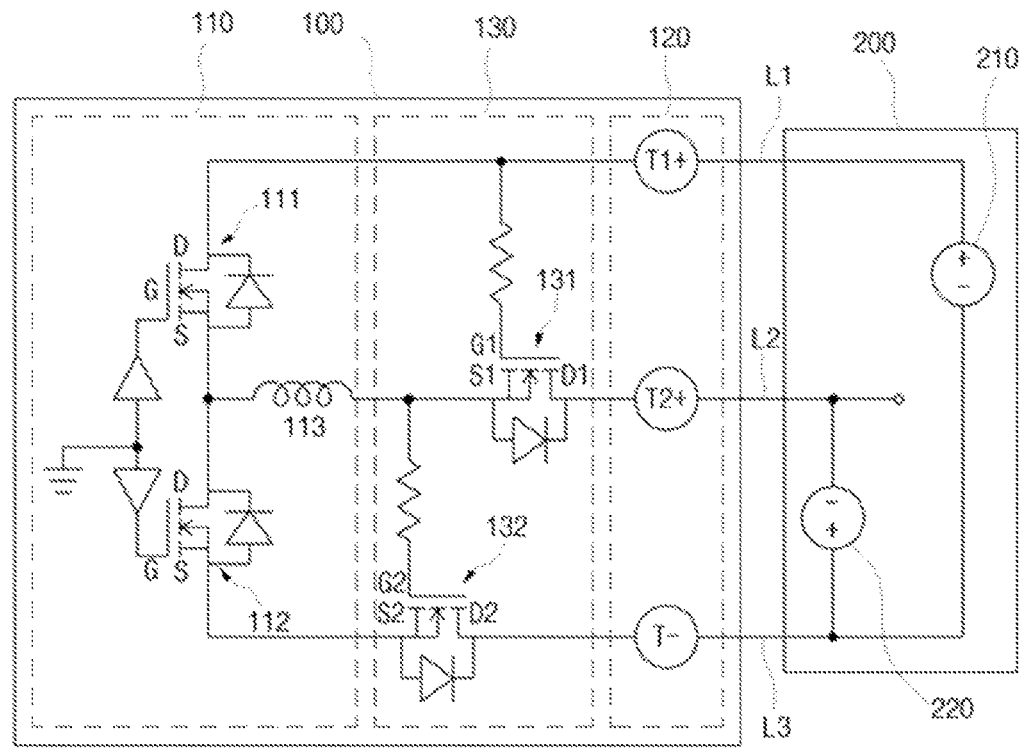
FIGS. 2A to 2C are circuit diagrams illustrating a case when a high voltage battery is normally connected but a low voltage battery is erroneously connected.
Figure 2B:
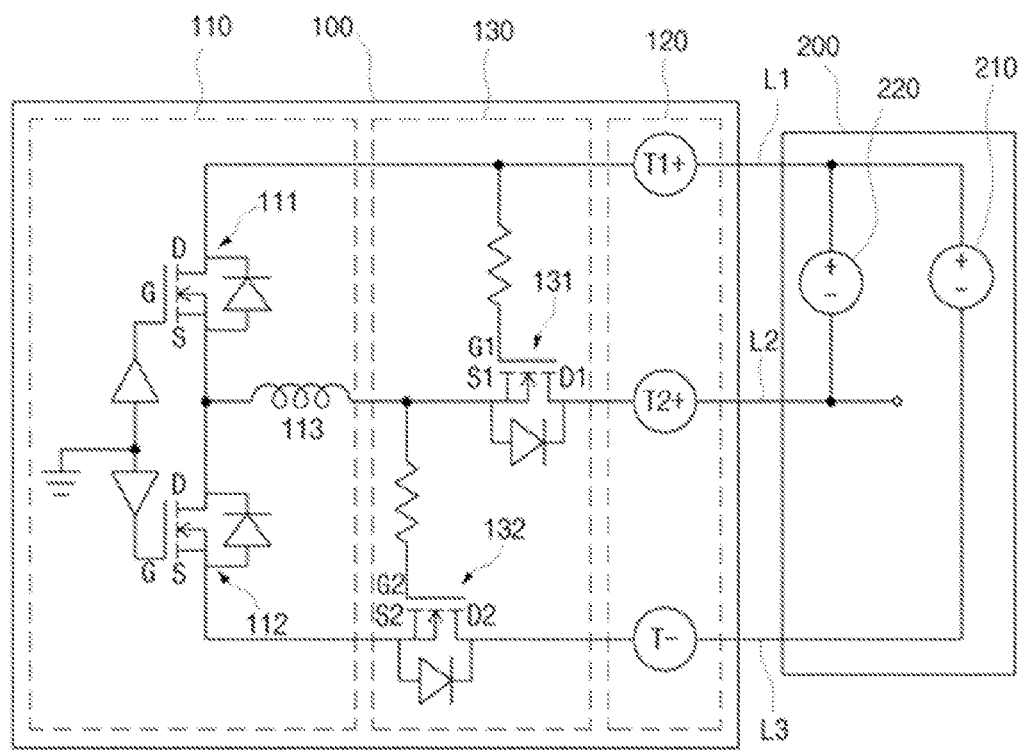
Figure 2C:
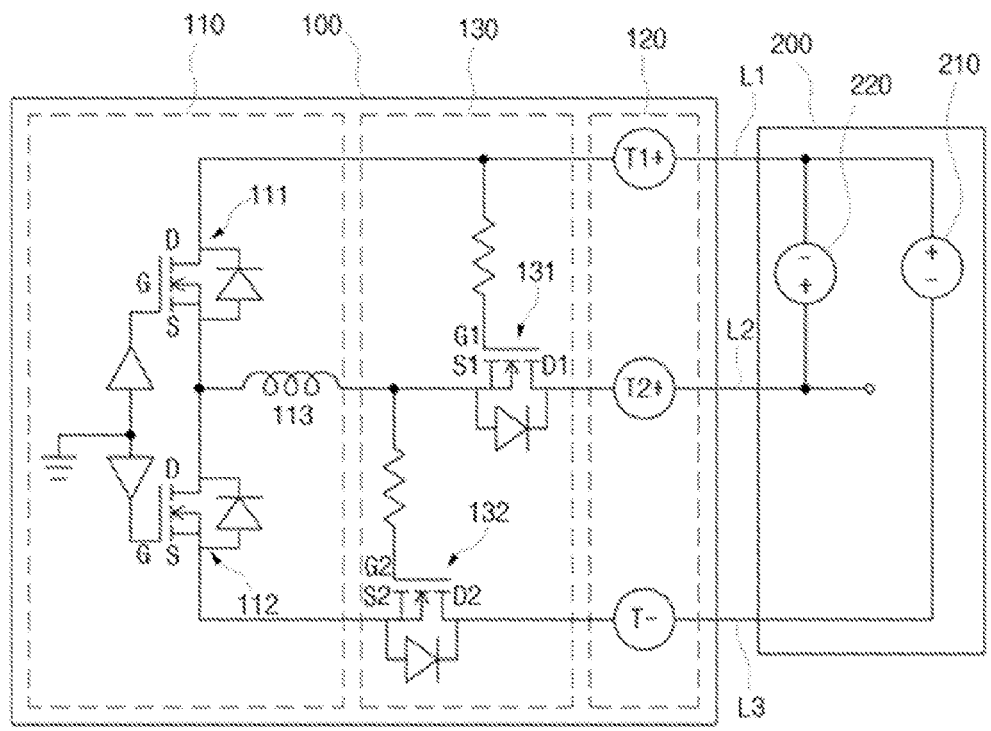
Figure 3A:
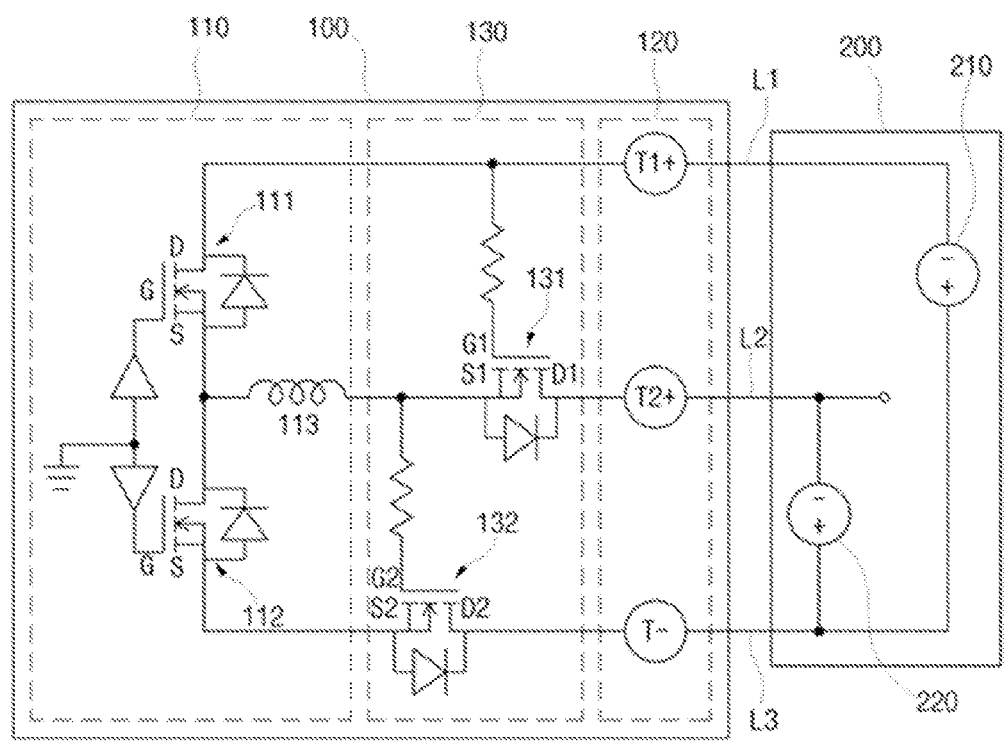
FIGS. 3A to 3C are circuit diagrams illustrating a case when a high voltage battery is reversely connected and a low voltage battery is erroneously connected.
Figure 3B:
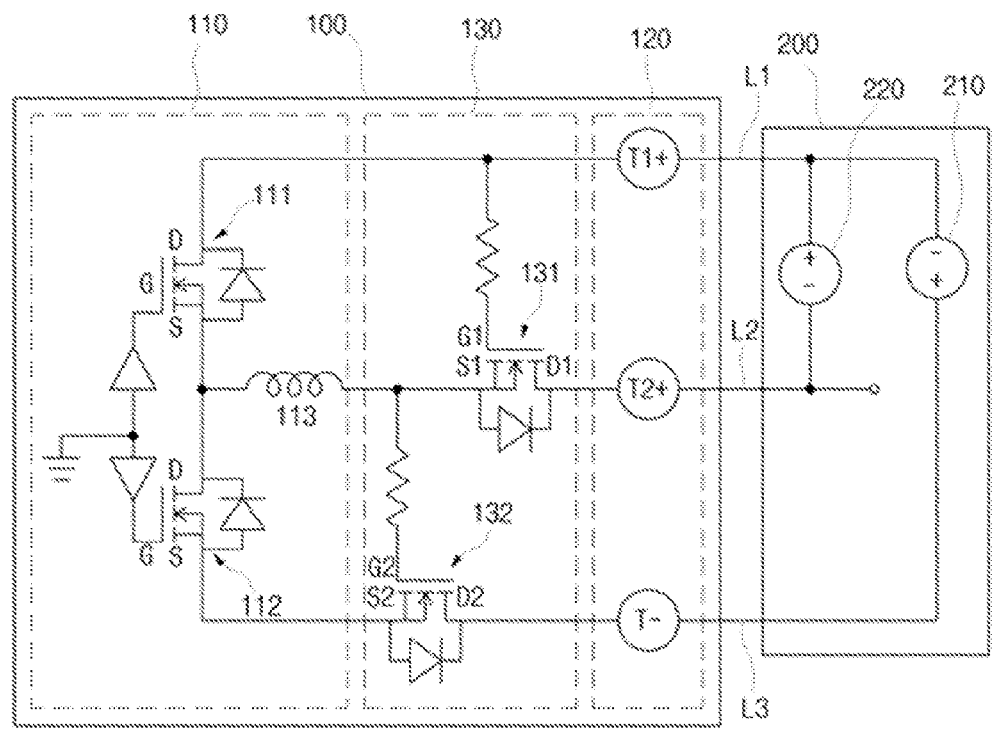
Figure 3C:
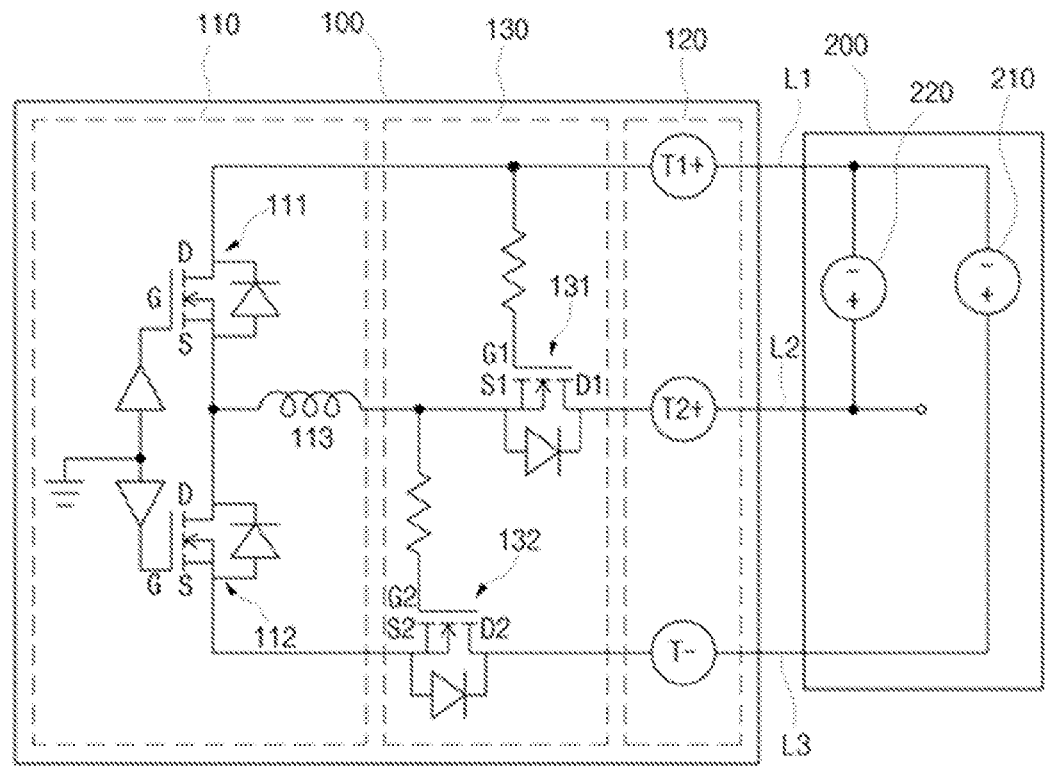
Figure 4A:
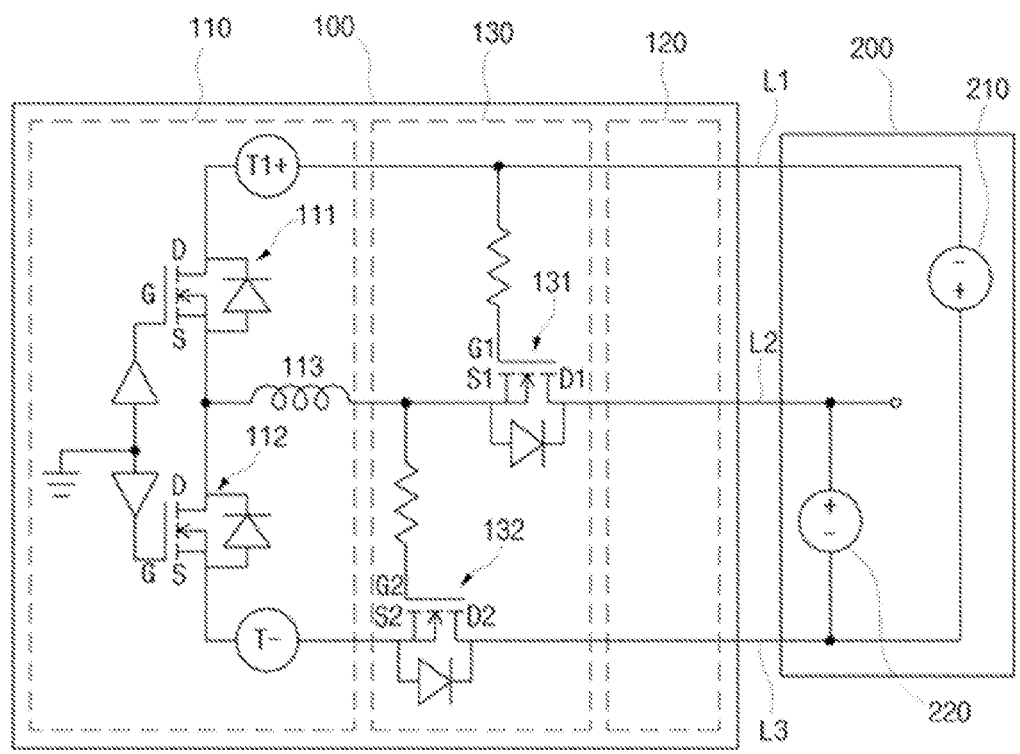
FIGS. 4A to 4C are circuit diagrams illustrating a case when a low voltage battery is normally connected but a high voltage battery is erroneously connected.
Figure 4B:
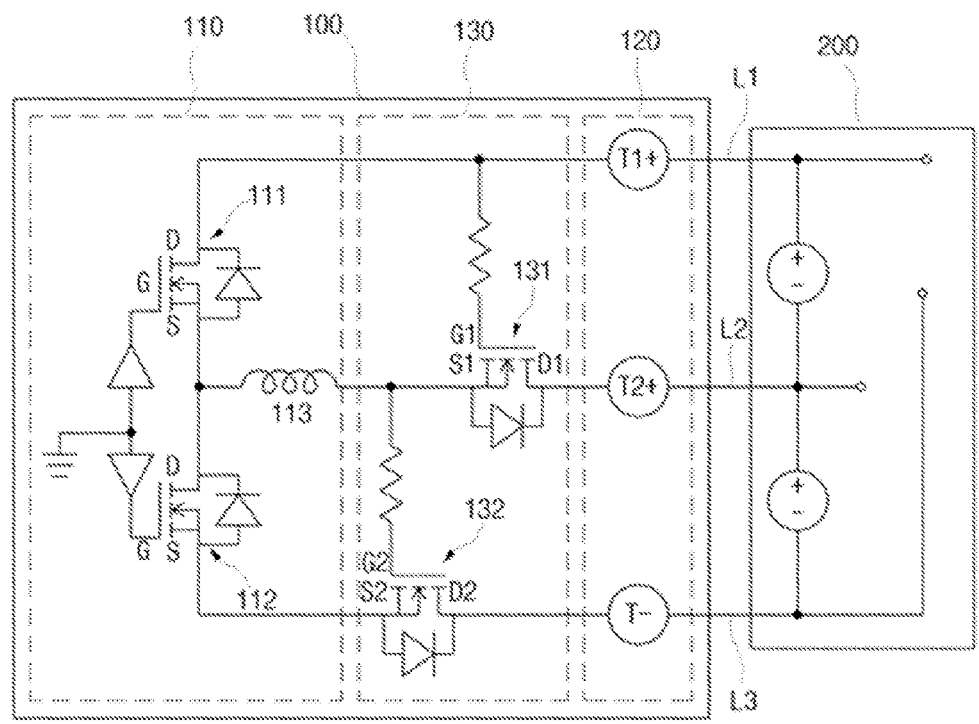
Figure 4C:
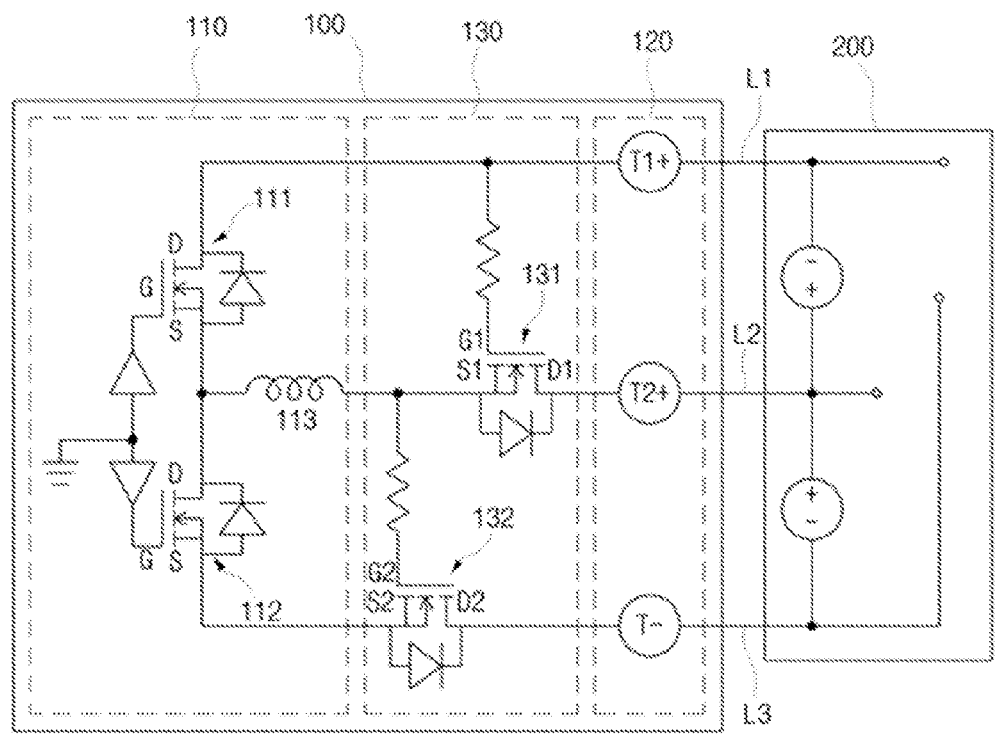
Figure 5A:
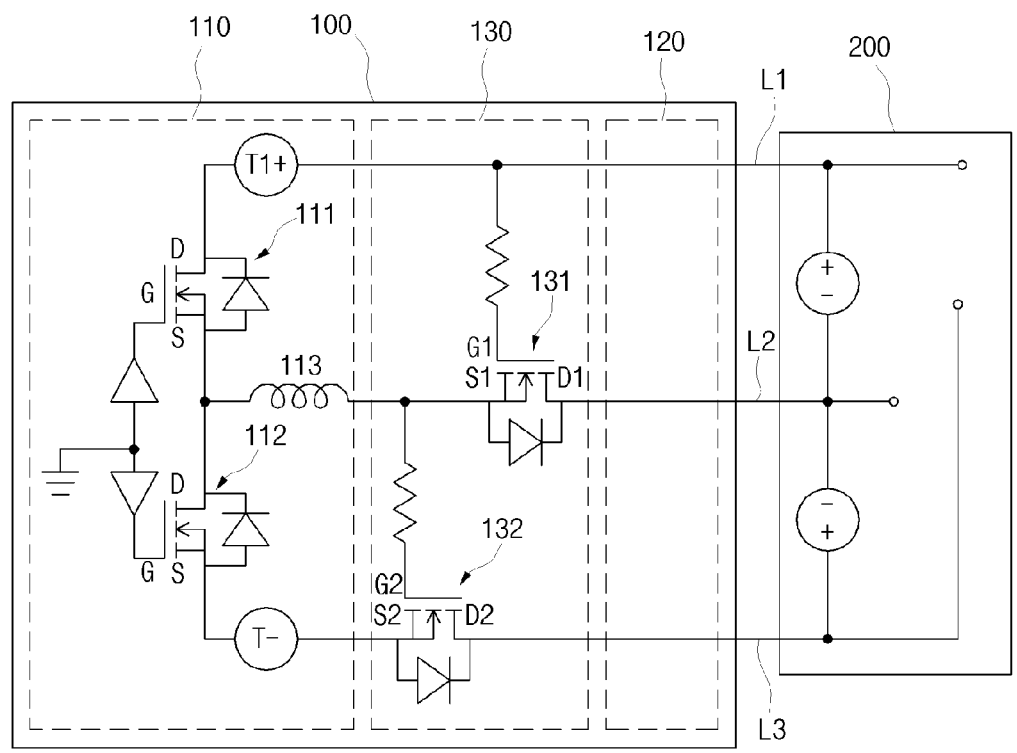
FIGS. 5A to 5C are circuit diagrams illustrating a case when a high voltage battery is erroneously connected and a low voltage battery is reversely connected.
Figure 5B:
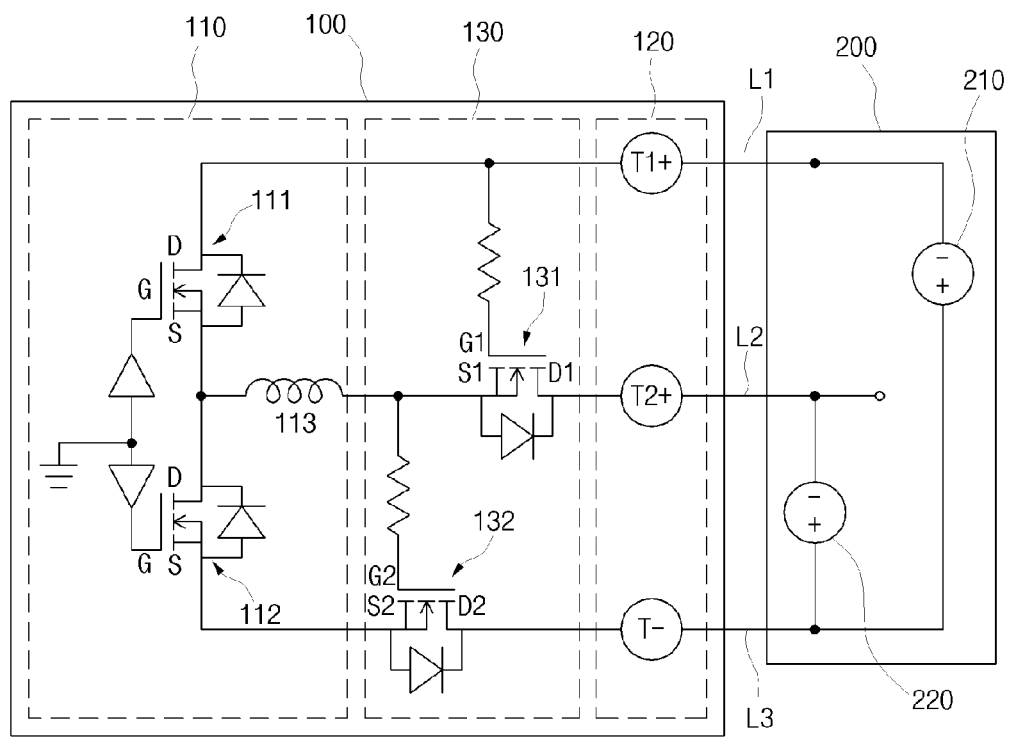
Figure 5C:
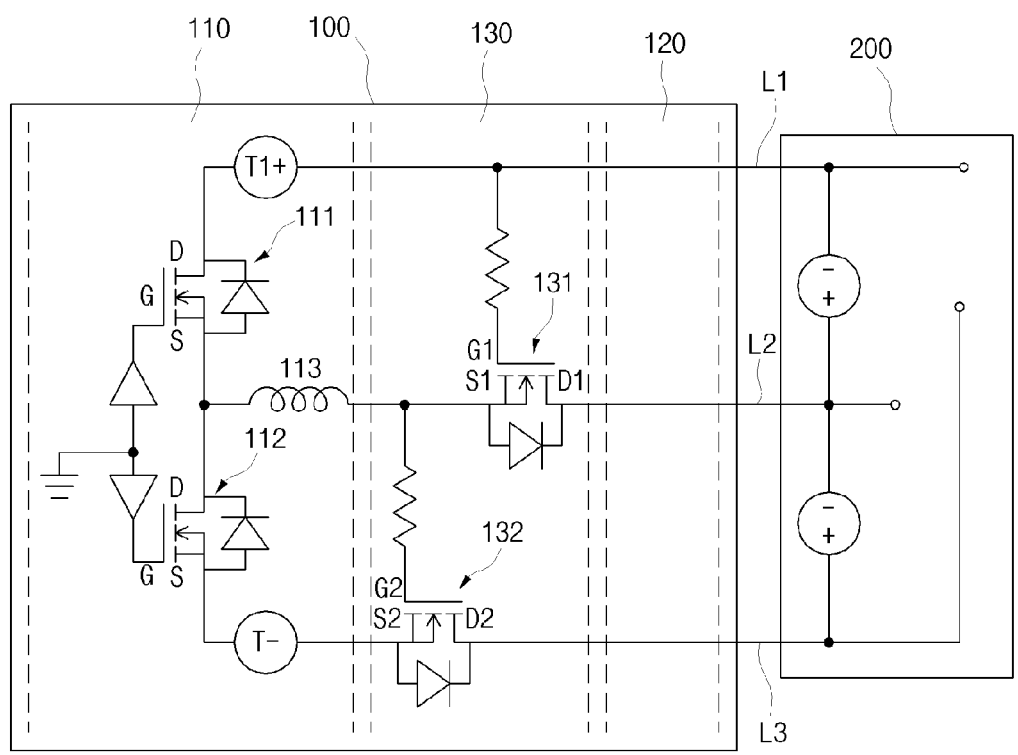

FIGS. 2 to 5 are circuit diagrams illustrating an example in which a power supply is erroneously connected to the DC-DC converter, in which FIGS. 2A to 2C illustrate a case when a high voltage battery is normally connected but a low voltage battery is erroneously connected, FIGS. 3A to 3C illustrate a case when a high voltage battery is reversely connected and a low voltage battery is erroneously connected, FIGS. 4A to 4C illustrate a case when a low voltage battery is normally connected but a high voltage battery is erroneously connected, and FIGS. 5A to 5C illustrate a case when a high voltage battery is erroneously connected and a low voltage battery is reversely connected.

Since the operations of the protection circuit in the exemplary embodiments are the same, only one case in each exemplary embodiment will be described.

Referring to FIG. 2A, since a high voltage is normally connected, the first protection element 131 is turned on. However, as the first protection element 131 is turned on, the negative electrode of the low voltage battery 220 is connected to the gate G2 of the second protection element 132 so that the second protection element 132 is turned off. Therefore, a current path is not formed.

As illustrated in FIG. 3A, when the high voltage battery 210 and the low voltage battery 220 are erroneously connected, since both the first and second protection elements 131 and 132 are turned off, the current path is not formed.

As illustrated in FIG. 4A, even though the low voltage battery 220 is normally connected, the high voltage battery 210 is reversely connected, so that the first protection element 131 is turned off and the current path is not formed.

As illustrated in FIG. 5A, when the negative electrode of the high voltage battery 210 is connected to the low voltage battery positive connection terminal to form erroneous connection and the low voltage battery 220 is reversely connected, even though the first protection element 131 is turned on, the second protection element 132 is turned off, so that the current path is not formed.

Even though the DC-DC converter with a protection circuit for a connection error according to the present invention has been described with reference to the exemplary embodiment, the scope of the present invention is not limited to a specific exemplary embodiment and various substitutions, modifications, and changes may be made within a scope which is obvious to those skilled in the art.

When a protection circuit for a connection error of the present invention is applied to a DC-DC converter, even though a high voltage battery and a low voltage battery are erroneously connected to the DC-DC converter, a protection element of the protection circuit is maintained to be turned off, so that no current path is formed, which may prevent a short circuit caused by an erroneous connection.

Therefore, different from the related art which uses a fuse to prevent the overcurrent due to an erroneous connection, since the current path is shut off by a circuit, an expensive fuse is not used, thereby saving cost. Further, a size of an MOS FET is smaller than a size of the fuse, thereby reducing a size of the circuit.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A DC-DC converter to convert a high voltage of a high voltage battery into a low voltage to charge a low voltage battery, the DC-DC converter comprising:
    a connecting unit connecting the high voltage battery and the low voltage battery;
    a converting unit configured to convert the high voltage which is supplied from the high voltage battery into the low voltage to charge the low voltage battery; and
    a protection circuit located between the connecting unit and the converting unit, and configured to be turned off turned off to shut off a current path between the high voltage battery and the low voltage, in response to an erroneous connection of the either one or both of the high voltage battery and the low voltage battery, wherein the protection circuit comprises
    a first protection element connected between a high voltage input line to which a positive electrode of the high voltage battery is connected and a low voltage output line to which a positive electrode of the low voltage battery is connected, and configured to be turned on, in response to a turn-on voltage or higher being applied to the high voltage input line, and
    a second protection element connected between the low voltage line and the low voltage output line to which a negative electrode of the high voltage battery and a negative electrode of the low voltage battery are commonly connected, and configured to be turned on, in response to the turn on voltage or higher being applied to the low voltage output line.

2. The DC-DC convertor of claim 1, wherein the first and second protection elements comprise MOS-FETs.

3. The DC-DC convertor of claim 2, wherein a current path is formed in the low voltage output line, in response to the first protection element being turned on, and the current path of the low voltage output line is shut off, in response to the first protection element being turned off.

4. The DC-DC convertor of claim 2, wherein the second protection element is configured to be turned on or turned off in accordance with a voltage on the low voltage output line, in response to the first protection element being turned on.

5. The DC-DC convertor of claim 2, wherein
    a gate of the first protection element is connected between the converting unit and the connecting unit on the high voltage input line,
    a source of the first protection element is connected to the converting unit along the low voltage output line, and
    a drain of the first protection element is connected to the connecting unit along the low voltage output line.

6. The DC-DC convertor of claim 2, wherein
    a gate of the second protection element is connected between the first protection element and the converting unit on the low voltage output line,
    a source of the second protection element is connected to the converting unit along the low voltage line, and
    a drain of the second protection element is connected to the connecting unit along the low voltage line.

7. The DC-DC convertor of claim 2, wherein the converting unit comprises
    a first switching element connected between the high voltage input line and the low voltage output line,
    a second switching element connected between the low voltage output line and the low voltage line, and
    an inductor which is connected between a contact of the first and second switching elements and the first protection element.

8. The DC-DC convertor of claim 7, wherein the first protection element is disposed between the inductor and a low voltage battery positive connection terminal disposed on the low voltage output line and connected with a positive electrode of the low voltage battery.

9. The DC-DC converter of claim 8, wherein a first resistor is disposed between the first protection element and the high voltage input line.

10. The DC-DC converter of claim 9, wherein a second resistor is disposed between the second protection element and the low voltage output line, and is connected to the low voltage output line between the inductor and the first protection element.

11. The DC-DC convertor of claim 1, wherein the connecting unit comprises
a high voltage battery positive connection terminal located on the high voltage input line and connected with a positive electrode of the high voltage battery,
a low voltage battery positive connection terminal located on the low voltage output line and connected with a positive electrode of the low voltage battery, and
a negative connection terminal located on the low voltage line and commonly connected with a negative electrode of the high voltage battery and a negative electrode of the low voltage battery.

12. The DC-DC convertor of claim 1, wherein the erroneous connection comprises any one or any combination of any two or more of the high voltage battery being normally connected and the low voltage battery being erroneously connected, the high voltage battery being reversely connected and the low voltage battery being erroneously connected, the low voltage battery being normally connected and the high voltage battery being erroneously connected, and the high voltage battery being erroneously connected and the low voltage battery being reversely connected.

* * * * *